United States Patent [19]
Zebker et al.

[11] 4,450,447
[45] May 22, 1984

[54] SYNTHETIC APERTURE RADAR TARGET SIMULATOR

[75] Inventors: Howard A. Zebker, Palo Alto; Daniel N. Held, Altadena; Richard M. Goldstein; Thomas C. Bickler, both of La Canada, all of Calif.

[73] Assignee: The United States of America as represented by the Administrator of the National Aeronautics and Space Administration, Washington, D.C.

[21] Appl. No.: 284,287

[22] Filed: Jul. 17, 1981

[51] Int. Cl.³ ............................................. G01S 7/40
[52] U.S. Cl. ...................................... 343/17.7; 434/2
[58] Field of Search ................ 343/17.1 PF, 17.2 PC, 343/17.7; 84/DIG. 26; 434/1, 2, 3, 4, 5, 6, 7, 8, 9, 10

[56] References Cited

U.S. PATENT DOCUMENTS

| | | | |
|---|---|---|---|
| 3,671,657 | 6/1972 | Murphree | 434/6 |
| 3,713,081 | 1/1973 | Murphree | 434/8 |
| 3,731,309 | 5/1973 | Meyer et al. | 343/17.7 |
| 3,829,596 | 8/1974 | Murphree | 434/6 |
| 3,835,234 | 9/1974 | Murphree | 35/10.4 |
| 3,885,323 | 5/1975 | Kaase et al. | 434/2 |
| 3,962,657 | 6/1976 | Redman et al. | 343/17.7 |
| 4,000,676 | 1/1977 | Love | 84/DIG. 26 |
| 4,004,424 | 1/1977 | Fetter | 343/17.7 |
| 4,085,524 | 4/1978 | Meyer | 434/2 |
| 4,121,213 | 10/1978 | Bush et al. | 343/17.7 |
| 4,389,915 | 6/1983 | Bione | 84/DIG. 26 |

Primary Examiner—Maynard R. Wilbur
Assistant Examiner—Brian Steinberger
Attorney, Agent, or Firm—Paul F. McCaul; Thomas H. Jones; John R. Manning

[57] ABSTRACT

A synthetic aperture radar (SAR) target simulator for simulating the radar return, or echo, from a target seen by a SAR antenna mounted on a platform moving with respect to the target includes a first-in first-out memory (26) which has digital information clocked in at a rate related to the frequency of a transmitted radar signal and digital information clocked out with a fixed delay defining range between the SAR and the simulated target, and at a rate related to the frequency of the return signal. An rf input signal having a frequency similar to that utilized by a synthetic aperture array radar is mixed with a local oscillator (16) signal to provide a first baseband signal having a frequency considerably lower than that of the rf input signal. The first baseband signal is converted to a plurality of digital words which are clocked into the memory (26) at a rate related to the frequency of the local oscillator (16). A synthesizer (34) is locked to the local oscillator (16) and provides an output signal having a nominal frequency equal to that of the local oscillator (16), but altered in accordance with range changes between the SAR and the simulated target, as well as in accordance with Doppler information associated with return signals from the target.

5 Claims, 3 Drawing Figures

SYNTHETIC APERTURE RADAR TARGET SIMULATOR

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

FIELD OF THE INVENTION

The invention relates to synthetic aperture array radars and more specifically to a simulator for generating an echo pulse reflected from a point target having frequency and delay characteristics of an actual echo pulse received by a synthetic aperture array radar mounted on a moving platform such as an aircraft or an orbiting satellite.

BACKGROUND OF THE INVENTION

Ground testing of an airborne or spaceborne synthetic aperture array radar is generally quite difficult if one attempts to simulate the effects of the orbital environment as well as the Doppler characteristics of the radar echo. In order to accurately simulate the echo, an echo must be produced that realistically models an expected return received by an orbiting sensor. Typical synthetic aperture radar system test apparatus simulate only the Doppler frequency component of a return echo. However, another factor contributing to the frequency characteristics of a return echo is related to the round trip time between the transmission of an outgoing radar pulse and the receipt of an echo or return pulse at the radar transmitter. A conventional simulator only simulates the Doppler component introduced by a predetermined closure rate between the simulated target and the transmitting radar. The additional delay characteristic of the echo return is dependent upon round trip delay time changes as the moving platform passes over the target, these changes being referred to as range curvature information or characteristics. The synthetic aperture radar target simulator provided by the invention accurately simulates a radar echo or return generated by a point target scanned by a synthetic aperture radar and contains effects related both to Doppler frequency information and range curvature information associated with the simulated target.

SUMMARY OF THE INVENTION

The invention provides a synthetic aperture radar target simulator for altering the frequency and delay of an input rf signal by an amount related to range curvature information and Doppler frequency information associated with a simulated target. The simulator includes a memory means, a local oscillator, and a means for mixing an input rf signal and the local oscillator output signal to provide a first baseband signal. The invention also provides a first means for converting the first baseband signal to a plurality of input digital words to be stored in the memory means, each of the digital words being related to an instantaneous amplitude of the first baseband signal. A synthesizer is also provided having a nominal output frequency related to the local oscillator frequency. A means is provided for altering the synthesizer nominal output frequency by an amount related to the instantaneous range of and the Doppler shift introduced by the simulated target. A second means is provided for accessing each of the plurality of input digital words stored in the memory means at a rate related to the synthesizer altered output frequency, the digital words being accessed on the first-in first-out basis from the memory means. A means is provided for converting these accessed memory means digital output words to an analog second baseband signal. A means is further provided for mixing the second baseband signal and the synthesizer output signal to provide an output rf signal that precisely simulates the frequency characteristics of an echo signal from an actual target as received by a moving synthetic aperture array, these frequency characteristics containing both range curvature information and Doppler information.

In a specific embodiment of the invention, the input signal is at a frequency of approximately 1.7 gigahertz, and the local oscillator is chosen to provide a first baseband signal of approximately zero to 10 megahertz. This signal is sampled approximately every 0.05 microseconds, converted into a digital word, and stored in the memory means. The digital words are then accessed in the memory means at a rate related to range curvature information and Doppler information associated with the simulated target. The accessed digital words are then converted to an analog signal which is then further converted to an output rf signal which contains frequency components that precisely simulate an actual radar echo pulse as seen by a moving synthetic aperture radar antenna. In addition, the simulator provided by the invention can also be utilized to accurately access azimuth characteristics of a synthetic aperture radar antenna.

The novel features that are considered characteristic of this invention are set forth with particularity in the appended claims. The invention will best be understood from the following description when read in connection with the accompanying drawings.

DESCRIPTION OF PREFERRED EMBODIMENT

A detailed illustrative embodiment of the invention disclosed herein exemplifies the invention and is currently considered to be the best embodiment for such purposes. It is provided by way of illustration and not limitation of the invention. Accordingly, the specific embodiment disclosed is representative in providing a basis for the claims which define the scope of the present invention.

As previously explained, the disclosed simulator provides a simple and effective means for simulating range curvature information and Doppler information contained in a radar echo from a point target that is received by a synthetic aperture radar antenna mounted on a moving platform such as an aircraft or orbiting satellite. An rf input signal having a frequency of a transmitted radar pulse is mixed with a local oscillator output signal and passed through a low pass filter to generate a lower frequency signal which is converted to a plurality of digital words by an analog to digital converter. The digital words are clocked into a first-in first-out memory device at a rate related to the frequency of the local oscillator output signal. A frequency synthesizer is locked to the local oscillator to have a nominal output frequency identical to that of the local oscillator. However, a controller provides an input signal to the synthesizer that is related to a simulated round trip delay time between the simulated target and the synthetic aperture array antenna and the Doppler shift associated with the simulated target which is related to the rate of change of the range between the synthetic aperture radar antenna and the simulated target. The output of the synthesizer is utilized to generate a clock signal related to the frequency of the synthesizer, this clock signal being utilized to access stored digital words in the first-in first-out memory on a first-in first-out basis. These digital words are then provided to a digital to analog converter which converts them to a second baseband signal which is mixed with the synthesizer output to provide an output rf signal. As can be appreciated, the frequency of this output rf signal is related to Doppler shifts as well as range curvature information associated with the simulated target, thereby providing a simulated synthetic aperture radar echo signal having characteristics heretofore unobtainable with conventional simulators.

Figure 1:
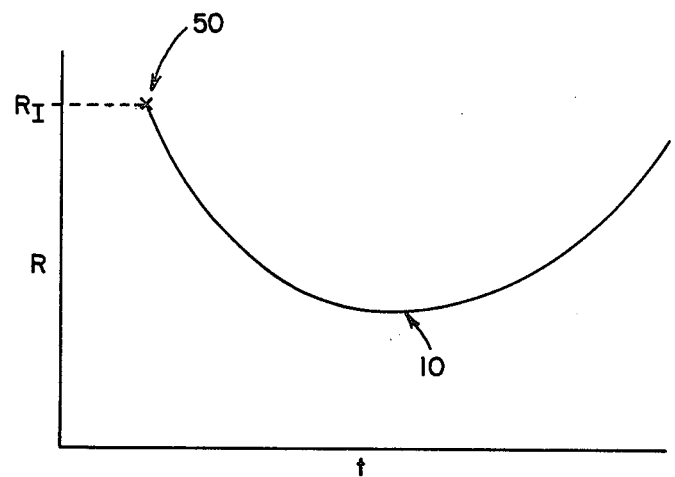
FIG. 1 is a graph showing the relationship between range and time of a point target with respect to a moving platform containing a synthetic aperture radar antenna.

Referring now to FIG. 1, the radar-target geometry being simulated is illustrated. The round trip delay time $D(t)$ between transmission and reception of a radar pulse equals $2R(t)$ divided by c where c is the velocity of light and $R(t)$ is the instantaneous slant range to the target. In reference to FIG. 1, it can be seen that the target is closest to the synthetic aperture radar at a point 10. The instantaneous Doppler frequency $f_d(t)$ generated by motion of the target with respect to the radar is equal to twice the rate of change of the instantaneous slant range $R(t)$ to the target divided by the wavelength ($\lambda$) of the radar signal illuminating the target. Thus, it can be appreciated that a significant problem associated with synthetic aperture radar target simulators involves accounting for two characteristics associated with a real target return, the first being changes in the round trip delay time between the target and the synthetic aperture radar antenna and the second being the instantaneous Doppler frequency shift generated by the motion of the synthetic aperture radar antenna with respect to the target.

Figure 2:
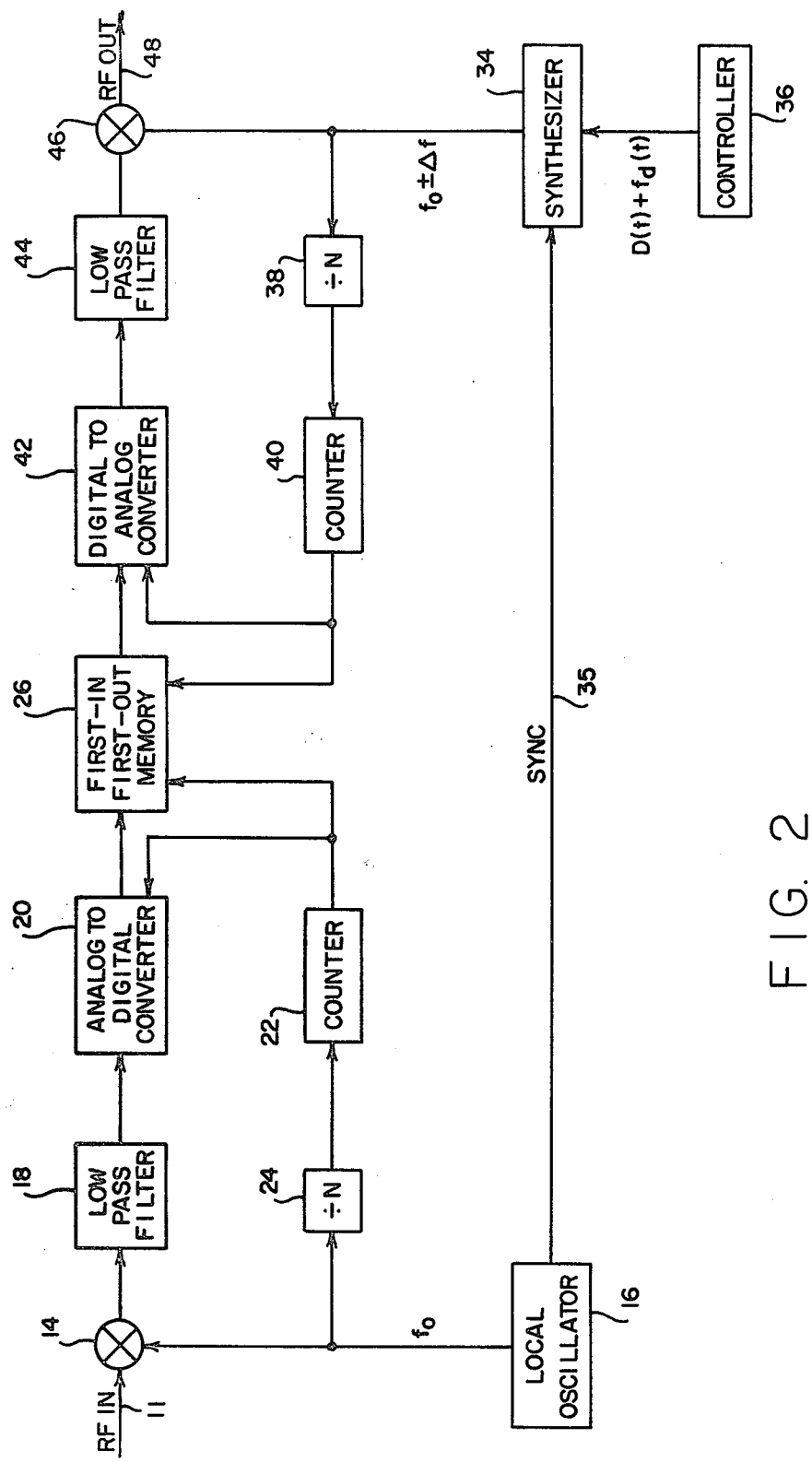
FIG. 2 is a block diagram of a synthetic aperture radar target simulator according to the invention.

Referring to the block diagram of FIG. 2, an rf input signal which could be approximately 1.7 gigahertz is provided on an input line 11 to a first mixer 14 which has as an input a reference signal from a local oscillator 16 having a frequency $f_o$. The output of the first mixer 14 is provided to a first low pass filter 18, the output of which is defined as a first baseband signal. The local oscillator 16 in the exemplary embodiment is chosen so that the heterodyne products from the mixer 14 provide a signal in the range of zero to 10 megahertz at the output of the low pass filter 18. The first baseband signal is provided to an analog-to-digital converter 20 which provides a plurality of digital output words, each of which corresponds to an instantaneous amplitude of the first baseband signal. As previously explained, the analog-to-digital converter 20 provides a digital output word each 0.05 microseconds. A counter or clocking means 22 and a divide by N circuit 24 is provided which provides a first clock signal to the analog-to-digital converter 20 and to a first-in first-out memory means 26. N in the divide by N circuit 24 is chosen to provide a first clock signal from the counter 22 that corresponds to the rate at which digital words are to be generated by the analog-to-digital converter and clocked into the first-in first-out memory 26. Thus, in the specific embodiment, N is chosen so that the counter 22 will provide a first clock signal every 0.05 microseconds. The first-in first-out memory 26 could be any type of digital storage device having sufficient memory capacity to store the number of digital words to be generated during the maximum anticipated round trip delay time between the synthetic aperture array and the simulated target.

A synthesizer 34 is provided which has a nominal output frequency $f_o$ corresponding to that of the local oscillator 16. A sync line 35 interconnects the synthesizer 34 and the local oscillator 16 in order to provide coherency between the two output signals. A controller 36, which could be a microprocessor or a digital computer, provides a frequency modulation signal to the synthesizer 34 that is related to the instantaneous round trip delay time between the synthetic aperture radar antenna and the simulated target, and the expected Doppler shift caused by movement of the synthetic aperture array and the simulated target. Both of these signals in the examplary embodiment are summed within the controller 36 and provided as a single varying digital signal to the synthesizer 34. A typical synthesizer that could be utilized is a Digiphase Synthesizer manufactured by Dana Manufacturing Company. The output of the synthesizer 34 is thus a synthesized signal having a nominal frequency $f_o$ and a $\Delta$ frequency related to the output signal from the controller 36. This output signal from the synthesizer 34 is then divided by a second divide by N circuit 38 which in turn indexes a second counter or clocking means 40 for providing second clock signals to the digital-to-analog converter 42 and the first-in first-out memory 26. N in the two divide by N circuits, 24 and 38, is the same. Each second clock signal is utilized by the first-in first-out memory 26 to output the first received digital word stored in the memory 26 which has not previously been outputed. The output of the memory 26 is provided to a digital-to-analog converter 42, the output of which defines a second baseband signal. This signal is provided to a second low pass filter 44 and a second mixer 46. The output of the synthesizer 34 is also provided to the second mixer 46, thereby providing an rf output signal on an output line 48 which has the same nominal frequency as the rf input signal but contains a frequency modulation related to range curvature information and Doppler information associated with the simulated target.

In operation, the rf input signal is mixed with an output signal from the local oscillator 16 and passed through a first low pass filter 18 to provide a first baseband signal. This signal is converted to a plurality of digital words which are clocked in to the first-in first-out memory 26 by first clock signals generated by the counter 22. These clock signals are coherent with the output frequency of the local oscillator 16. The first-in first-out memory 26 is chosen to provide a fixed initial condition delay before a second clock signal from the second counter 40 can shift the first digital word out of the memory 26. Referring to FIG. 1, this initial delay corresponds to the round trip time associated with the simulated target range at point 50, this initial delay representing the delay between the transmission of a radar pulse and the time its echo is received by the synthetic aperture array. Thus, the initial delay in the memory 26 between the time the first digital word is received and the time that the first digital word is outputed corresponds to round trip time for the initial range $R_I$. This delay can be implemented in various ways, one being to merely provide an initial fixed delay between the receipt at the memory 26 of the second clock signal from the second counter 40 and the transfer of the first digital input word out of the memory 26. The synthesizer 34 provides an output signal having a frequency $f_o \pm \Delta f$ wherein $\Delta f$ relates to the instantaneous round trip time between the simulated synthetic aperture array antenna and the simulated target plus the Doppler associated with the rate of change of range between the simulated target and the antenna. The frequency $f_o$ is the same as the output frequency of the local oscillator. The second counter 40 provides second clock signals that are coherent with the frequency of the synthesizer 34 output, that is $f_o \pm \Delta f$, and thus clocks out digital words from the memory 26 at a rate which is coherent with the synthesizer 34 output frequency. These digital words are then converted to an analog signal by the digital-to-analog converter 42, passed through the second low pass filter 44 and are summed with the synthesizer 34 output signal to provide an rf output on line 48. Thus it can be appreciated that a simulator provided by the invention can provide a simulated rf signal that has the frequency and phase characteristics of an echo from a point target as received by a moving synthetic aperture radar. By use of a first-in first-out memory, and by controlling the flow of information into the memory with clock signals coherent with the transmitted pulse, and controlling the flow of information out of the memory by clock signals that are coherent with a simulated echo pulse, a high frequency rf output signal can be generated which simulates an actual echo pulse received by a moving synthetic aperture radar.

Figure 3:
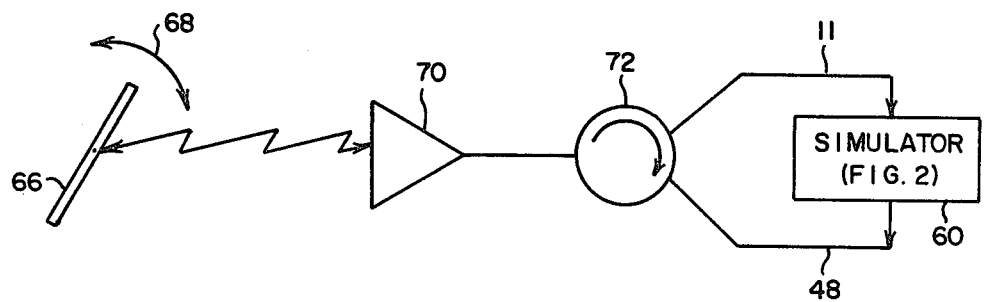
FIG. 3 is a schematic diagram showing an application of the synthetic aperture radar target simulator provided by the invention wherein azimuth characteristics of a synthetic aperture radar antenna can be determined.

A further application of the invention can be seen with reference to FIG. 3. Here a simulator 60 as shown in FIG. 2 has an rf input line 11 that carries a transmitted pulse and an rf output line 48 that carries a simulated echo pulse. A synthetic aperture array antenna 66 is shown which can be rotated in azimuth as indicated by the arrow 68. A receiving antenna 70 is connected to a circulator 72 which provides incoming rf signals on line 11 and couples outgoing rf signals on line 48 to the antenna 70 for transmission back to the synthetic aperture array antenna 66. Thus as the synthetic aperture array antenna 66 rotates, antenna characteristics resulting from different antenna azimuth orientations can be tested. Therefore by using the test configuration shown in FIG. 3, phase and amplitude performance of the synthetic aperture array antenna 66 can be tested as well as the antenna's ability to reject azimuth ambiguities.

Although one particular embodiment of the invention has been described and illustrated herein, it is recognized that modifications and variations may readily occur to those skilled in the art. Consequently, it is intended that the claims be interpreted to cover such modifications and equivalents.

What is claimed is:

1. A synthetic aperture radar target simulator for altering the frequency and time delay of an input rf signal by an amount related to range curvature information and Doppler frequency information associated with a simulated target, said simulator comprising:

a local oscillator for generating a signal of frequency $f_o$;

means for mixing said input rf signal and said local oscillator output signal to provide a first baseband signal;

means for converting said first baseband signal to a plurality of input digital words to be stored in memory means, each of said digital words being related to an instantaneous amplitude of said first baseband signal;

means responsive to said signal of frequency $f_o$ for clocking said digital words into said memory;

means for generating a signal having a nominal output frequency related to said local oscillator output frequency by a difference $\pm \Delta f$;

means for controlling said signal generating means to alter said nominal output frequency by an amount related to the instantaneous range and Doppler shift of a simulated target;

means for accessing each of said plurality of input digital words stored in said memory means at a rate related to said altered nominal output frequency, said digital words being accessed on a first-in first-out basis;

means for converting said accessed memory means digital output words to an analog second baseband signal; and means for mixing said second baseband signal and said nominal output signal to provide an output rf signal that simulates a return signal that has frequency characteristics related to both range curvature information and Doppler information that would be contained in a return signal from an actual target.

2. The simulator of claim 1 wherein said first memory means is of the type that will store a digital word in response to a first clock signal and read out a digital word in response to a second clock signal, said simulator further comprising:

first counting means for generating said first clock signal having a predetermined relationship with respect to the frequency of said local oscillator, means for providing said first clock signals to said memory means, second counting means for generating said second clock signal having a predetermined relationship with respect to said altered nominal output frequency, and means for providing said second clock signal to said memory means.

3. A synthetic aperture radar target simulator for altering the frequency of an input rf signal by an amount related to range curvature information and Doppler frequency information associated with a simulated target, said simulator comprising:

means for mixing an input rf signal and a local oscillator signal to generate a first baseband signal having a lower frequency than that of said input rf signal, means for converting said first baseband signal to a plurality of digital words each of which is related to an instantaneous amplitude of said first baseband signal;

a first-in first-out memory means;

means for generating first clock signals having a frequency related to the frequency of said local oscillator signals;

means for providing said first clock signals to said memory means, thereby causing said memory means to store one of said plurality of digital words in response to one of said first clock signals;

means for generating a synthesized signal having a frequency related to said local oscillator frequency, range curvature information associated with said simulated target, and Doppler frequency information associated with said simulated target;

means for generating a plurality of second clock signals having a frequency related to said synthesized signal;

means for providing said second clock signals to said memory means for accessing one of said stored digital words, each of said digital words being accessed in the order in which it was stored in said memory means;

means for converting said accessed digital words into an analog signal defining a second baseband signal; and means for mixing said second baseband signal and said synthesized signal to form an rf output signal having a frequency related to range curvature information and Doppler frequency information associated with said simulated target.

4. A synthetic aperture radar target simulator for altering the frequency and time delay of an input rf signal by an amount related to range curvature information and Doppler information associated with a simulated target, said simulator comprising:

memory means for storing an input digital word upon the occurrence of a first clock signal and outputting on a first-in first-out basis one of said stored input digital words upon the occurrence of a second clock signal;

means for generating a reference signal for mixing with said input rf signal to produce a first baseband signal, an analog-to-digital converter for converting said first baseband signal to a plurality of input digital words to be provided to said memory means;

first clocking means for generating first clock signals having a frequency related to the frequency of said reference signal;

means for providing said first clock signals to said memory means, thereby successively storing said input digital words;

means for generating a synthesized signal having a frequency related to said reference signal frequency range, curvature information associated with said simulated target, and Doppler information associated with said simulated target;

second clocking means for generating second clock signals having a frequency related to the frequency of said synthesized signal;

means for providing said second clock signals to said memory means, thereby successively outputting said input digital words at a rate related to the frequency of said synthesized signal;

a digital-to-analog converter for converting said memory means output digital words into an analog second baseband signal; and means for mixing said second baseband signal and said synthesized signal to provide an output rf signal having a frequency related to said input rf signal frequency, said range curvature information and said Doppler information.

5. A method of simulating a synthetic aperture radar echo signal having a frequency and time delay related to range information and Doppler frequency information associated with a simulated target, said method comprising the steps of:

generating a local oscillator signal;

mixing an input rf signal and said local oscillator signal to provide a first baseband signal;

converting said first baseband signal to a plurality of input digital words each of which corresponds to an instantaneous amplitude of said first baseband signal;

generating first clock signals at a frequency related to said local oscillator frequency;

storing said digital words in a first-in first-out memory means in response to said first clock signals;

generating a synthesized signal having a frequency related to said local oscillator signal, range curvature information associated with said simulated target, and Doppler information associated with said simulated target;

generating second clock signals at a frequency related to the frequency of said synthesized signal;

accessing said stored digital words in said memory means on a first-in first-out basis in response to said second clock signals;

converting said accessed words to an analog second baseband signal; and mixing said second baseband signal and said synthesized signal to form an output rf signal having a frequency related to said simulated target range curvature information and Doppler information.

* * * * *